United States Patent
Wang

(10) Patent No.: US 9,477,266 B2
(45) Date of Patent: Oct. 25, 2016

(54) HANDHELD DEVICE FOR CONTROLLING ELECTRONIC EQUIPMENT AND ELECTRONIC EQUIPMENT

(71) Applicants: BOE TECHNOLOGY GROUP CO., LTD., Beijing (CN); BOE Optical Science and Technology Co., Ltd., Suzhou (CN)

(72) Inventor: Hongyun Wang, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 14/802,597

(22) Filed: Jul. 17, 2015

(65) Prior Publication Data
US 2016/0202731 A1  Jul. 14, 2016

(30) Foreign Application Priority Data
Jan. 12, 2015  (CN) .................... 2015 2 0018604 U

(51) Int. Cl.
*G06F 1/16*  (2006.01)
(52) U.S. Cl.
CPC ........... *G06F 1/1656* (2013.01); *G06F 1/1626* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,400,560 B1* | 6/2002 | Chian | ................. | B60R 11/0235 248/917 |
| 8,737,066 B1* | 5/2014 | Block | ....................... | A45F 5/00 224/217 |
| 8,770,539 B1* | 7/2014 | Hsu | ..................... | B60R 11/0241 248/126 |
| 8,941,989 B2* | 1/2015 | Pollex | .................. | F16M 11/041 248/418 |
| 8,964,364 B2* | 2/2015 | Abdelsamie | .......... | G06F 1/1628 361/679.03 |
| 9,001,511 B2* | 4/2015 | Gobeil | .................. | G06F 1/1626 248/316.4 |
| 2003/0201970 A1* | 10/2003 | Liu | ....................... | G06F 1/1626 345/156 |
| 2011/0309117 A1* | 12/2011 | Roberts | ..................... | A45F 5/00 224/217 |
| 2012/0075799 A1* | 3/2012 | Pollex | .................. | F16M 11/041 361/679.56 |
| 2015/0146370 A1* | 5/2015 | Juan | ........................ | H05K 5/03 361/679.56 |
| 2015/0355681 A1* | 12/2015 | Chen | ..................... | G06F 1/1654 361/679.56 |
| 2016/0179143 A1* | 6/2016 | Bidwell | ............... | G06F 1/1656 361/679.4 |

* cited by examiner

*Primary Examiner* — Lisa Lea Edmonds
(74) *Attorney, Agent, or Firm* — Nath, Goldberg & Meyer; Joshua B. Goldberg

(57) ABSTRACT

The present invention provides a handheld device for controlling electronic equipment and an electronic equipment including the handheld device. The handheld device is electrically connected with a control unit of the electronic equipment. The handheld device includes an annulus, and a first and a second disc bodies arranged oppositely. A first contact point and at least three second contact points are arranged on the first disc body. A first probe and at least three second probes are arranged on the second disc body. The annulus is connected to the first disc body and is used for driving the first disc body to rotate. The second disc body is fixed to a shell of the electronic equipment.

15 Claims, 4 Drawing Sheets

US 9,477,266 B2

HANDHELD DEVICE FOR CONTROLLING ELECTRONIC EQUIPMENT AND ELECTRONIC EQUIPMENT

FIELD OF THE INVENTION

The present invention relates to a handheld device for controlling electronic equipment and electronic equipment including the handheld device.

BACKGROUND OF THE INVENTION

With a rapid development of information industry, handheld electronic products such as smart phones, tablet computers and the like have gradually entered the daily lives of people. Because of preference of people for touching a large screen, screens of the smart phones are larger and larger and are gradually developed from 3 inches to 6 inches, 7 inches or even larger.

As increase of sizes, inconvenience is brought to usage. For example, for a female or child user having smaller palms, it is difficult to hold a mobile phone with a screen of 6 or 7 inches or a tablet computer with a size larger than 10 inches by one hand. If operating by a single hand, the user has to hold the bottom of the product by one hand. If the user is understrength, the electronic equipment may be liable to fall from the hand, resulting in damage. In addition, patients lying in bed or people fond of lying on the back to watch the mobile phone often need to support the equipment by double hands to maintain stability, thus failing to carry out single-hand operation.

In order to solve the above technical problems, the prior art provides a technical solution, namely a handheld device (for example, a ring, a bracelet or the like) is added on a shell of the electronic equipment, for placing a finger or palm of the user therein, so as to enable the user to hold the electronic equipment in hand more conveniently and stably. However, the handheld device in the prior art is single in function and is merely used by the user for holding the electronic equipment in hand.

SUMMARY OF THE INVENTION

The present invention aims at providing a handheld device for controlling electronic equipment and an electronic equipment including the handheld device.

According to one aspect of the present invention, a handheld device for controlling electronic equipment is provided, and the handheld device is electrically connected with a control unit of the electronic equipment. The handheld device includes an annulus, and a first disc body and a second disc body, which are arranged oppositely. A first contact point and at least three second contact points electrically connected with the first contact point are arranged on the first disc body, directions and lengths of connecting lines between respective second contact points and the first contact point are different. A first probe and at least three second probes electrically connected with the control unit of the electronic equipment are arranged on the second disc body, the first probe is electrically connected with the first contact point on the first disc body, and when the first disc body rotates, the second probes are respectively in contact with the second contact points on the first disc body in sequence. The annulus is connected to the first disc body and is used for driving the first disc body to rotate, and the second disc body is fixed to a shell of the electronic equipment.

According to an exemplary embodiment, the first contact point may be arranged at a center of the first disc body, and the first disc body may rotate around the first contact point.

According to an exemplary embodiment, the number of the second contact points and the number of the second probes may be both three.

According to an exemplary embodiment, the annulus may be a ring used for holding a finger of a user. A connecting support may be arranged on the first disc body, a groove is formed in one end of the connecting support, and first through holes are formed in two side walls of the groove. A first projection matched with the groove may be arranged on the annulus, and a second through hole is formed in the first projection. The handheld device may further include a first connecting shaft penetrating through the first through holes in the two side walls of the groove and the second through hole in the first projection for connecting the annulus to the connecting support of the first disc body, and the annulus is capable of being in contact with the shell of the electronic equipment by rotating around the first connecting shaft.

According to an exemplary embodiment, end parts of the two side walls of the groove may be arc-shaped.

According to an exemplary embodiment, end part of the first projection may be arc-shaped.

According to an exemplary embodiment, the annulus may be a bracelet used for holding a palm of a user. A second projection having a third through hole may be arranged on the first disc body. The handheld device may further include a second connecting shaft and a connecting groove capable of holding the second projection, and fourth through holes are formed in two side walls of the connecting groove. The second connecting shaft may penetrate through the third through hole and the fourth through holes to connect the connecting groove to the second projection of the first disc body. One end of the annulus may be fixed on the connecting groove, and the other end of the annulus may be rounded to form a closed ring shape.

According to another aspect of the present invention, an electronic equipment includes a control unit and a handheld device electrically connected with the control unit. The handheld device includes an annulus, and a first disc body and a second disc body, which are arranged oppositely. A first contact point and at least three second contact points electrically connected with the first contact point are arranged on the first disc body, directions and lengths of connecting lines between respective second contact points and the first contact point are different. A first probe and at least three second probes electrically connected with the control unit of the electronic equipment are arranged on the second disc body, the first probe is electrically connected with the first contact point on the first disc body, and when the first disc body rotates, the second probes are respectively in contact with the second contact points on the first disc body in sequence. The annulus is connected to the first disc body and is used for driving the first disc body to rotate, and the second disc body is fixed to a shell of the electronic equipment. The annulus is arranged at outside of the shell of the electronic equipment, and the first disc body and the second disc body are arranged inside the shell of the electronic equipment.

According to an exemplary embodiment, the electronic equipment may be a mobile phone or a tablet computer.

According to the handheld device provided by exemplary embodiments of the present invention, a user can better hold the electronic equipment in hand for watching, while the electronic equipment can be controlled (for example, volume or brightness the electronic equipment can be adjusted)

DETAILED DESCRIPTION OF THE EMBODIMENTS

In order that those skilled in the art can better understand the technical solutions of the present invention, a further detailed description of the present invention will be given below in combination with the accompanying drawings and specific implementations.

Figure 1:
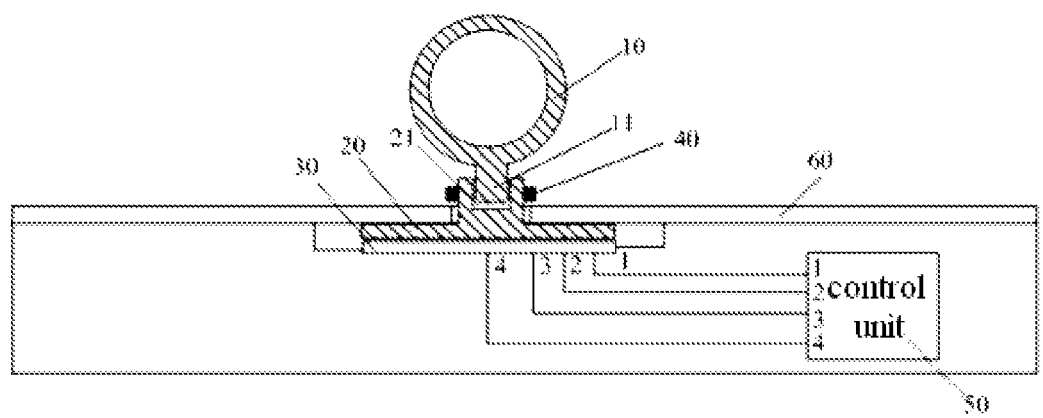
FIG. 1 is a schematic diagram of a structure of an electronic equipment with a handheld device according to an embodiment of the present invention.
Figure 9:
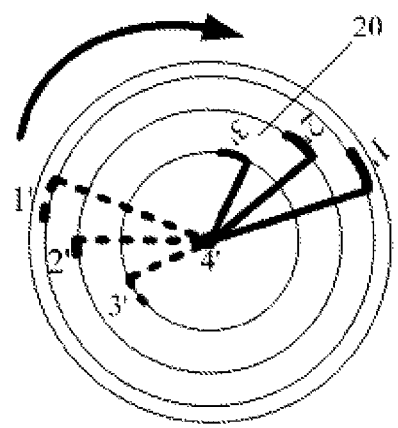
FIG. 9 is a schematic diagram of contact points on a first disc body of the handheld device according to an embodiment of the present invention.
Figure 10:
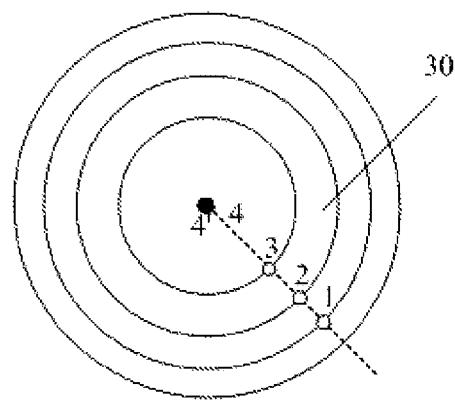
FIG. 10 is a schematic diagram of probes on a second disc body of the handheld device according to an embodiment of the present invention.

FIG. 1 is a schematic diagram of a structure of an electronic equipment with a handheld device according to an embodiment of the present invention, FIG. 9 is a schematic diagram of contact points on a first disc body of the handheld device according to an embodiment of the present invention, and FIG. 10 is a schematic diagram of probes on a second disc body of the handheld device according to an embodiment of the present invention.

With reference to FIGS. 1, 9 and 10, the electronic equipment according to an exemplary embodiment includes a control unit 50 and a handheld device electrically connected with the control unit 50. The handheld device includes an annulus 10 arranged at outside of a shell 60 of the electronic equipment, and a first disc body 20 and a second disc body 30 arranged inside the shell 60. A first contact point and a plurality of second contact points electrically connected with the first contact point are arranged on the first disc body 20, and directions and lengths of connecting lines between respective second contact points and the first contact point are different. A first probe and a plurality of second probes electrically connected with the control unit 50 are arranged on the second disc body 30, the first probe is electrically connected with the first contact point on the first disc body 20, and when the first disc body 20 rotates, the second probes are respectively in contact with the second contact points on the first disc body 20 in sequence. The annulus 10 is connected to the first disc body 20 and is used for driving the first disc body 20 to rotate, and the second disc body 20 is fixed to the shell 60 of the electronic equipment.

With reference to FIGS. 9 and 10, four contact points are arranged on the first disc body 20, wherein the first contact point is arranged at a center of the first disc body 20, and the first disc body 20 can rotate around the first contact point. The rest three second contact points are respectively arranged on the circumferences of concentric circles with the first contact point as the center and having different radiuses. The second contact points are electrically connected with the first contact point through conducting wires (for example, copper wires). The conducting wires used for connecting the first contact point and the second contact points may be exposed in the air. Alternatively, an insulating layer may cover on the conducting wires with only the first contact point and the second contact points exposed.

Four probes, namely one first probe and three second probes, are arranged on the second disc body 30. The first probe is arranged at a center of the second disc body 30 and is always kept in contact with the first contact point on the first disc body 20. When the first disc body 20 rotates around the first contact point, the three second probes are respectively in contact with the three second contact points on the first disc body 20 in sequence. In addition, the first probe and the second probes are electrically connected with the control unit 50 of the electronic equipment, and the control unit 50 may provide different voltages for the second probes and a grounding voltage for the first probe.

With reference to FIG. 1, for example, the control unit 50 may include four pins 1 to 4 for providing the voltages to the four probes. The voltage provided by the pin 4 for the first probe is 0V, the voltage provided by the pin 1 for the first second probe (referred to as second probe 1 below) is 1.2V, the voltage provided by the pin 2 for the second second probe (referred to as second probe 2 below) is 0.8V, and the voltage provided by the pin 3 for the third second probe (referred to as second probe 3 below) is 0.4V.

When the first disc body 20 rotates to a first preset angle, the second probe 1 is in contact with the first second point (referred to as second contact point 1' below) on the first disc body 20. At this time, the second probe 1, the second contact point 1', the first probe and the control unit 50 form a loop, the pin 4 of the control unit 50 may detect a voltage of 1.2V, so that the control unit 50 may determine that the second probe 1 is in contact with the second contact point P. When the first disc body 20 rotates to a second preset angle, the second probe 1 is separated from the second contact point 1', and the second probe 2 is in contact with the second contact point (referred to as second contact point 2' below) on the first disc body 20. At this time, the second probe 2, the second contact point 2', the first probe and the control unit 50 form a loop, the pin 4 of the control unit 50 may detect a voltage of 0.8V, so that the control unit 50 may determine that the second probe 2 is in contact with the second contact point 2'. When the first disc body 20 rotates to a third preset angle, the second probe 2 is separated from the second contact point 2', and the second probe 3 is in contact with the third second contact point (referred to as second contact point 3' below) on the first disc body 20. At this time, the second probe 3, the second contact point 3', the first probe and the control unit 50 form a loop, the pin 4 of the control unit 50 may detect a voltage of 0.4V, so that the control unit 50 may determine that the second probe 3 is in contact with the second contact point 3'.

Since the second disc body 50 is fixed to the shell 60, positions of the second probe 1, the second probe 2 and the second probe 3 are kept unchanged. When the first disc body 20 rotates clockwise (as shown in FIG. 9), the second contact point 1', the second contact point 2' and the second contact point 3' on the first disc body 20 are in contact with the second probe 1, the second probe 2 and the second probe 3 on the second disc body 30 in sequence, so that the pin 4 of the control unit 50 sequentially detects the voltages of 1.2V, 0.8V and 0.4V. When the first disc body 20 rotates counterclockwise, the sequence of the detected voltages is reverse. Therefore, the control unit 50 may determine a rotation direction of the first disc body 20 according to the change of the detected voltages. When the control unit 50 is connected with a volume adjustment circuit or a brightness adjustment circuit, the volume or brightness may be increased or decreased according to the rotation direction of the first disc body 20, so as to control the electronic equipment.

The control unit 50 can change the volume or brightness for an adjustment unit according to a group of detected complete signals (for example, 1.2V, 0.8V and 0.4V, or 0.8V, 0.4V and 1.2V, or 0.4V, 1.2V and 0.8V in the case of clockwise rotation; or 0.4V, 0.8V and 1.2V, or 0.8V, 1.2V and 0.4V, or 1.2V, 0.4V and 0.8V in the case of counter-clockwise rotation).

According to an exemplary embodiment, the number of the second probes and the number of the second contact points may be three for convenient operation.

Figure 2:
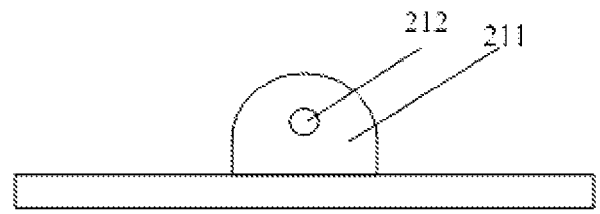
FIG. 2 is a side view of a first disc body in the handheld device shown in FIG. 1.
Figure 3:
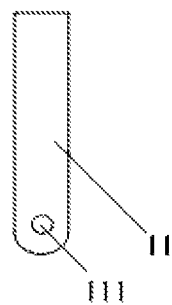
FIG. 3 is a side view of an annulus having a projection in the handheld device shown in FIG. 1.
Figure 4:
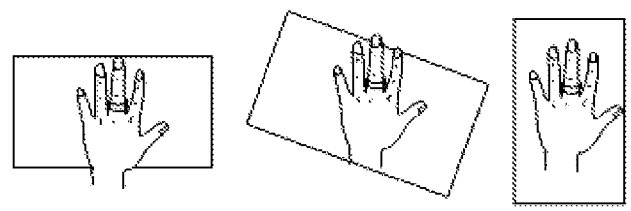
FIG. 4 is a schematic diagram illustrating that a user puts a finger in the annulus of the handheld device shown in FIG. 1 to operate the electronic equipment.

FIG. 2 is a side view of the first disc body in the handheld device shown in FIG. 1, FIG. 3 is a side view of the annulus having a projection in the handheld device shown in FIG. 1, and FIG. 4 is a schematic diagram illustrating that a user puts a finger in the annulus of the handheld device shown in FIG. 1 to operate the electronic equipment.

With reference to FIGS. 1 to 4, according to the current embodiment, the annulus 10 is implemented as a ring 10 used for holding a finger of a user. A connecting support 21 protruding outwards from the shell 60 of the electronic equipment may be arranged on the first disc body 20, a groove is formed in one end of the connecting support 21, and first through holes 212 are formed in two side walls 211 of the groove. A first projection 11 matched with the groove may be arranged on the ring 10, and a second through hole 111 is formed in the first projection 11. The handheld device may further include a first connecting shaft 40 penetrating through the first through holes 212 in the two side walls 211 of the groove and the second through hole 111 in the first projection 11 for connecting the ring 10 to the connecting support 21 of the first disc body 20, and the ring 10 is capable of being in contact with the shell 60 of the electronic equipment by rotating around the first connecting shaft 40.

Since the ring 10 may be in contact with the shell 60 by rotating around the first connecting shaft 40, the handheld device according to the present embodiment has a simple structure and does not occupy excessive space.

With reference to FIGS. 2 and 3, end parts of the two side walls 211 of the groove of the connecting support 21 may be formed to be arc-shaped, and end part of the first projection 11 may be formed to be arc-shaped also. When the ring 10 is in contact with the shell 60 by rotating around the first connecting shaft 40 (namely, the ring 10 is folded onto the shell 60 of the electronic equipment), the end parts of the two side walls 211 of the groove and the end part of the first projection 11 will be exposed at outside. When these end parts are arc-shaped, better safety can be provided.

Figure 5:
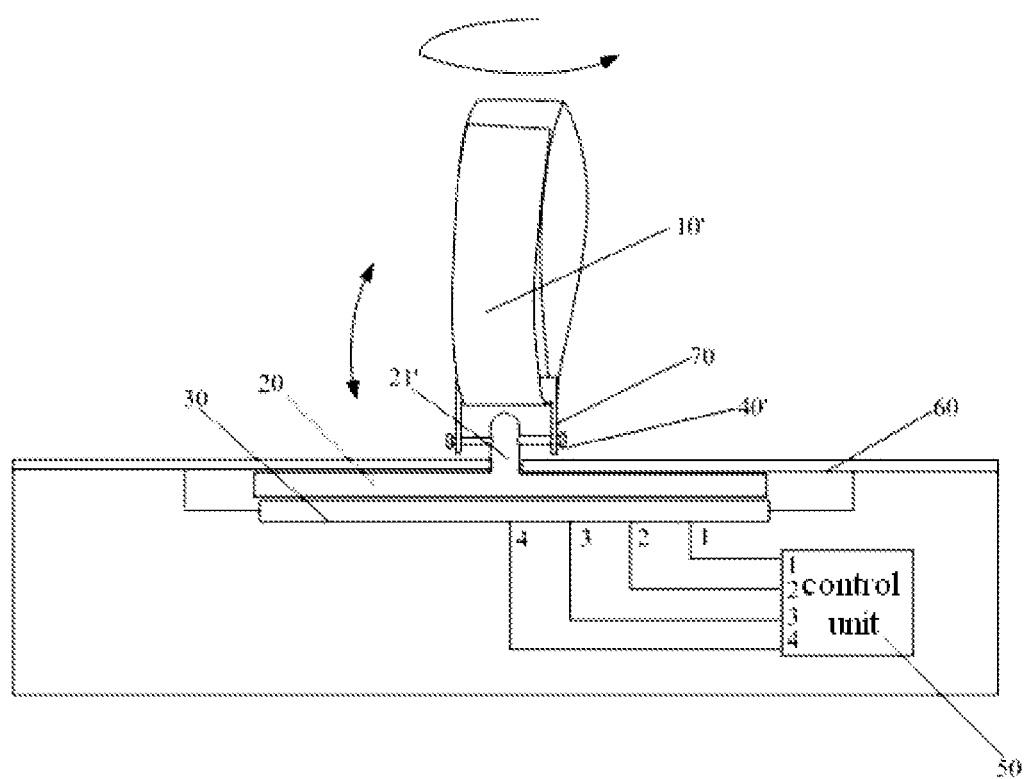
FIG. 5 is a schematic diagram of a structure of an electronic equipment with a handheld device according to another embodiment of the present invention.
Figure 6:
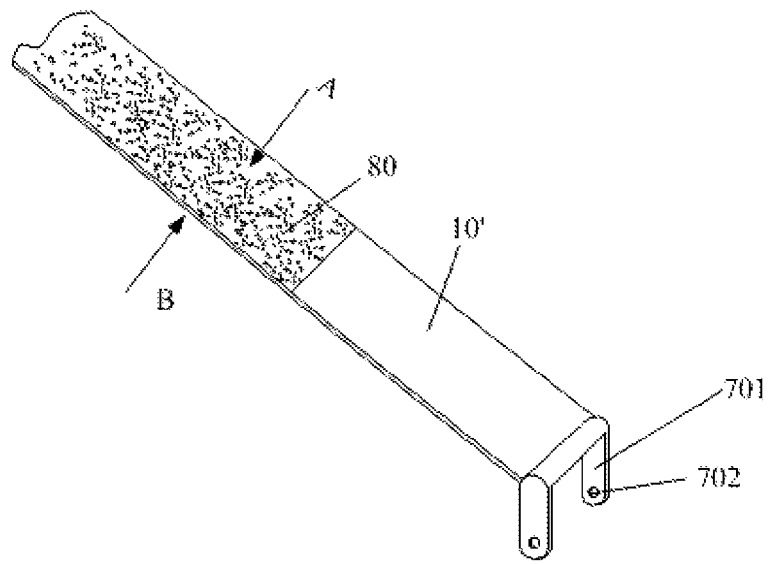
FIG. 6 is a schematic diagram of an annulus in the handheld device shown in FIG. 5.
Figure 7:
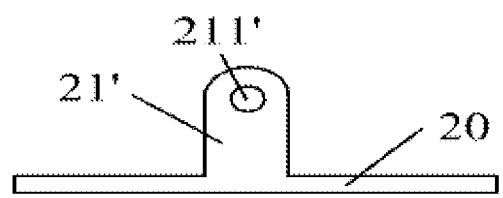
FIG. 7 is a side view of a first disc body in the handheld device shown in FIG. 5.
Figure 8:
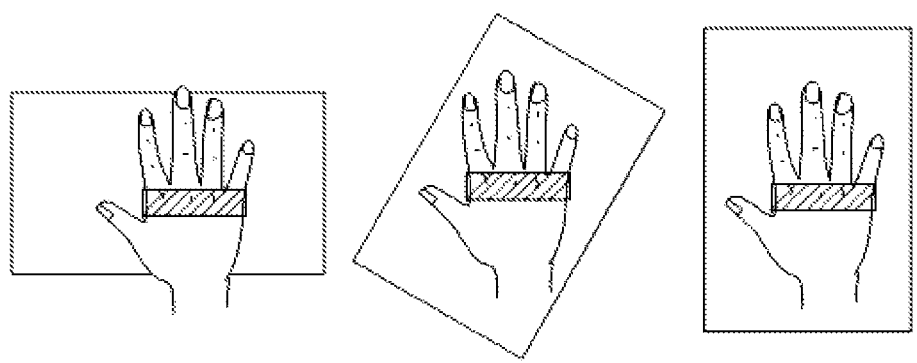
FIG. 8 is a schematic diagram illustrating that a user puts a palm in the annulus of the handheld device shown in FIG. 5 to operate the electronic equipment.

FIG. 5 is a schematic diagram of a structure of an electronic equipment with a handheld device according to another embodiment of the present invention, FIG. 6 is a schematic diagram of an annulus in the handheld device shown in FIG. 5, FIG. 7 is a side view of a first disc body in the handheld device shown in FIG. 5, and FIG. 8 is a schematic diagram illustrating that a user puts a palm in the annulus of the handheld device shown in FIG. 5 to operate the electronic equipment.

With reference to FIGS. 5 to 8, according to the present embodiment, the annulus 10 is implemented as a bracelet 10' used for holding a palm of the user. A second projection 21' having a third through hole 211' may be arranged on the first disc body 20. The handheld device may further include a second connecting shaft 40' and a connecting groove 70 capable of holding the second projection 21', and fourth through holes 702 are formed in two side walls 701 of the connecting groove 70. The second connecting shaft 40' may penetrate through the third through hole 211' and the fourth through holes 702 to connect the connecting groove 70 to the second projection 21' of the first disc body 20. One end of the bracelet 10' may be fixed on the connecting groove 70, and the other end of the bracelet may be rounded to form a closed ring shape.

According to an exemplary embodiment, a connecting component 80 may be arranged at the other end of the bracelet 10', and the connecting component 80 may be a velcro or a snap button arranged on both surfaces (A and B surfaces) of the bracelet 10'. For example, the connecting component 80 is the velcro, and two parts (the areas of the two parts may be different) of the velcro are respectively arranged on the two surfaces of the bracelet 10'. When the bracelet 10' penerates through the through hole formed by the connecting groove 70 and the second connecting shaft 40', the two parts of the velcro can firmly attach the two surfaces of the bracelet 10' to form a closed ring shape. The size of the ring shape is determined by the contact position of the two parts of the velcro to fit for the sizes of the palms of different users.

According to the exemplary embodiment, the electronic equipment may be a mobile phone or a tablet computer, and of course may also be electronic equipment with relatively smaller sizes such as an MP4 player or the like.

According to the handheld device and the electronic equipment including the handheld device provided by the embodiments of the present invention, a user can better hold the electronic equipment in hand for watching, while the electronic equipment can be controlled (for example, volume or brightness thereof can be adjusted) by the handheld device, to provide more convenient operation of the electronic equipment.

It can be understood that, the foregoing implementations are merely exemplary implementations used for illustrating the principle of the present invention, but the present invention is not limited hereto. Those of ordinary skill in the art can make various variations and improvements without departing from the spirit and essence of the present invention, and these variations and improvements shall fall within the protection scope of the present invention.

The invention claimed is:

1. A handheld device for controlling electronic equipment, wherein the handheld device is electrically connected with a control unit of the electronic equipment, the handheld device comprises an annulus, and a first disc body and a second disc body, which are arranged oppositely, wherein
a first contact point and at least three second contact points electrically connected with the first contact point are arranged on the first disc body, directions and lengths of connecting lines between respective second contact points and the first contact point are different, a first probe and at least three second probes electrically connected with the control unit of the electronic equipment are arranged on the second disc body, the first probe is electrically connected with the first contact point on the first disc body, and when the first disc body rotates, the second probes are respectively in contact with the second contact points on the first disc body in sequence, the annulus is connected to the first disc body and is used for driving the first disc body to rotate, and the second disc body is fixed to a shell of the electronic equipment.

2. The handheld device of claim 1, wherein the first contact point is arranged at a center of the first disc body, and the first disc body rotates around the first contact point.

3. The handheld device of claim 1, wherein the number of the second contact points and the number of the second probes are both three.

4. The handheld device of claim 1, wherein the annulus is a ring used for holding a finger of a user, a connecting support is arranged on the first disc body, a groove is formed in one end of the connecting support, and first through holes are formed in two side walls of the groove, a first projection matched with the groove is arranged on the annulus, and a second through hole is formed in the first projection, the handheld device further comprises a first connecting shaft penetrating through the first through holes in the two side walls of the groove and the second through hole in the first projection for connecting the annulus to the connecting support of the first disc body, and the annulus is capable of being in contact with the shell of the electronic equipment by rotating around the first connecting shaft.

5. The handheld device of claim 4, wherein end parts of the two side walls of the groove are arc-shaped.

6. The handheld device of claim 4, wherein end part of the first projection is arc-shaped.

7. The handheld device of claim 1, wherein the annulus is a bracelet used for holding a palm of a user, a second projection having a third through hole is arranged on the first disc body, the handheld device further comprises a second connecting shaft and a connecting groove capable of holding the second projection, and fourth through holes are formed in two side walls of the connecting groove, the second connecting shaft penetrates through the third through hole and the fourth through holes to connect the connecting groove to the second projection of the first disc body, one end of the annulus is fixed on the connecting groove, and the other end of the annulus is rounded to form a closed ring shape.

8. An electronic equipment, comprising a control unit and a handheld device electrically connected with the control unit, the handheld device comprises an annulus, and a first disc body and a second disc body, which are arranged oppositely, wherein a first contact point and at least three second contact points electrically connected with the first contact point are arranged on the first disc body, directions and lengths of connecting lines between respective second contact points and the first contact point are different, a first probe and at least three second probes electrically connected with the control unit of the electronic equipment are arranged on the second disc body, the first probe is electrically connected with the first contact point on the first disc body, and when the first disc body rotates, the second probes are respectively in contact with the second contact points on the first disc body in sequence, the annulus is connected to the first disc body and is used for driving the first disc body to rotate, and the second disc body is fixed to a shell of the electronic equipment, the annulus is arranged at outside of the shell of the electronic equipment, and the first disc body and the second disc body are arranged inside the shell of the electronic equipment.

9. The electronic equipment of claim 8, wherein the first contact point is arranged at a center of the first disc body, and the first disc body rotates around the first contact point.

10. The electronic equipment of claim 8, wherein the number of the second contact points and the number of the second probes are both three.

11. The electronic equipment of claim 8, wherein the annulus is a ring used for holding a finger of a user, a connecting support protruding outwards from the shell of the electronic equipment is arranged on the first disc body, a groove is formed in one end of the connecting support, and first through holes are formed in two side walls of the groove, a first projection matched with the groove is arranged on the annulus, and a second through hole is formed in the first projection, the handheld device further comprises a first connecting shaft penetrating through the first through holes in the two side walls of the groove and the second through hole in the first projection for connecting the annulus to the connecting support of the first disc body, and the annulus is capable of being in contact with the shell of the electronic equipment by rotating around the first connecting shaft.

12. The electronic equipment of claim 11, wherein end parts of the two side walls of the groove are arc-shaped.

13. The electronic equipment of claim 11, wherein end part of the first projection is arc-shaped.

14. The electronic equipment of claim 8, wherein the annulus is a bracelet used for holding a palm of a user, a second projection having a third through hole and protruding outwards from the shell of the electronic equipment is arranged on the first disc body, the handheld device further comprises a second connecting shaft and a connecting groove capable of holding the second projection, and fourth through holes are formed in two side walls of the connecting groove, the second connecting shaft penetrates through the third through hole and the fourth through holes to connect the connecting groove to the second projection of the first disc body, one end of the annulus is fixed on the connecting groove, and the other end of the annulus is rounded to form a closed ring shape.

15. The electronic equipment of claim 8, wherein the electronic equipment is a mobile phone or a tablet computer.

* * * * *